(12) United States Patent
Cheraghi et al.

(10) Patent No.: US 11,387,881 B2
(45) Date of Patent: Jul. 12, 2022

(54) FREQUENCY DOMAIN DIMENSION REDUCTION FOR CHANNEL STATE FEEDBACK

(71) Applicant: QUALCOMM Incorporated, San Diego, CA (US)

(72) Inventors: Parisa Cheraghi, San Diego, CA (US); Anas Tom, La Jolla, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 16/824,982

(22) Filed: Mar. 20, 2020

(65) Prior Publication Data

US 2021/0297133 A1 Sep. 23, 2021

(51) Int. Cl.
*H03D 3/22* (2006.01)
*H04B 7/06* (2006.01)
*H04B 7/0456* (2017.01)
*H04B 7/0417* (2017.01)
*H04L 5/00* (2006.01)

(52) U.S. Cl.
CPC ......... *H04B 7/0626* (2013.01); *H04B 7/0417* (2013.01); *H04B 7/0456* (2013.01); *H04L 5/0051* (2013.01)

(58) Field of Classification Search
CPC .. H04B 7/0626; H04B 7/0417; H04B 7/0456; H04L 5/0051
USPC ................ 375/329, 316, 219, 295
See application file for complete search history.

(56) References Cited

U.S. PATENT DOCUMENTS

2015/0381253 A1* 12/2015 Kim ............... H04B 7/0626
370/329
2018/0102817 A1* 4/2018 Park ............. H04B 7/04

* cited by examiner

*Primary Examiner* — Zewdu A Kassa
(74) *Attorney, Agent, or Firm* — Qualcomm Incorporated

(57) ABSTRACT

Various aspects of the present disclosure generally relate to wireless communication. In some aspects, a user equipment (UE) may receive, from a base station, a channel state information reference signal that includes a plurality of resource blocks. The UE may sub-sample one or more portions of the plurality of resource blocks prior to performing one or more channel state feedback computations. Accordingly, the UE may perform the one or more channel state feedback computations based at least in part on the one or more sub-sampled portions of the plurality of resource blocks and transmit, to the base station, a channel state feedback report based at least in part on the one or more channel state feedback computations that are performed using the one or more sub-sampled portions of the plurality of resource blocks. Numerous other aspects are provided.

30 Claims, 9 Drawing Sheets

FREQUENCY DOMAIN DIMENSION REDUCTION FOR CHANNEL STATE FEEDBACK

FIELD OF THE DISCLOSURE

Aspects of the present disclosure generally relate to wireless communication and to techniques and apparatuses for frequency domain dimension reduction for channel state feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the base station to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include: receiving, from a base station, a channel state information reference signal (CSI-RS) that includes a plurality of resource blocks; sub-sampling one or more portions of the plurality of resource blocks prior to performing one or more channel state feedback computations; performing the one or more channel state feedback computations based at least in part on the one or more sub-sampled portions of the plurality of resource blocks; and transmitting, to the base station, a channel state feedback report based at least in part on the one or more channel state feedback computations that are performed using the one or more sub-sampled portions of the plurality of resource blocks.

In some aspects, a UE for wireless communication may include a memory and one or more processors operatively coupled to the memory. The memory and the one or more processors may be configured to: receive, from a base station, a CSI-RS that includes a plurality of resource blocks; sub-sample one or more portions of the plurality of resource blocks prior to performing one or more channel state feedback computations; perform the one or more channel state feedback computations based at least in part on the one or more sub-sampled portions of the plurality of resource blocks; and transmit, to the base station, a channel state feedback report based at least in part on the one or more channel state feedback computations that are performed using the one or more sub-sampled portions of the plurality of resource blocks.

In some aspects, a non-transitory computer-readable medium may store one or more instructions for wireless communication. The one or more instructions, when executed by one or more processors of a UE, may cause the one or more processors to: receive, from a base station, a CSI-RS that includes a plurality of resource blocks; sub-sample one or more portions of the plurality of resource blocks prior to performing one or more channel state feedback computations; perform the one or more channel state feedback computations based at least in part on the one or more sub-sampled portions of the plurality of resource blocks; and transmit, to the base station, a channel state feedback report based at least in part on the one or more channel state feedback computations that are performed using the one or more sub-sampled portions of the plurality of resource blocks.

In some aspects, an apparatus for wireless communication may include: means for receiving, from a base station, a CSI-RS that includes a plurality of resource blocks; means for sub-sampling one or more portions of the plurality of resource blocks prior to performing one or more channel state feedback computations; means for performing the one or more channel state feedback computations based at least in part on the one or more sub-sampled portions of the plurality of resource blocks; and means for transmitting, to the base station, a channel state feedback report based at least in part on the one or more channel state feedback computations that are performed using the one or more sub-sampled portions of the plurality of resource blocks.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
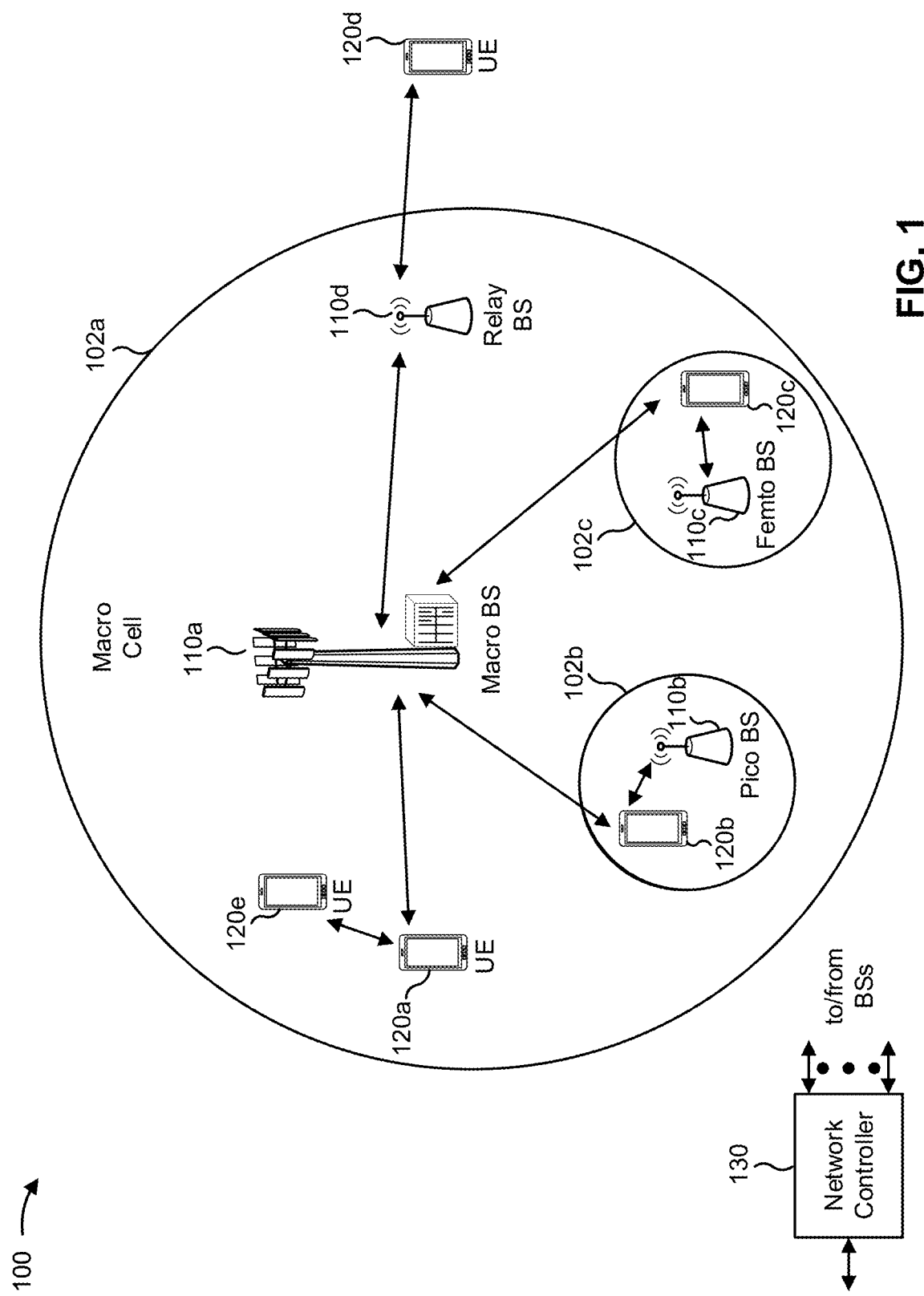
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
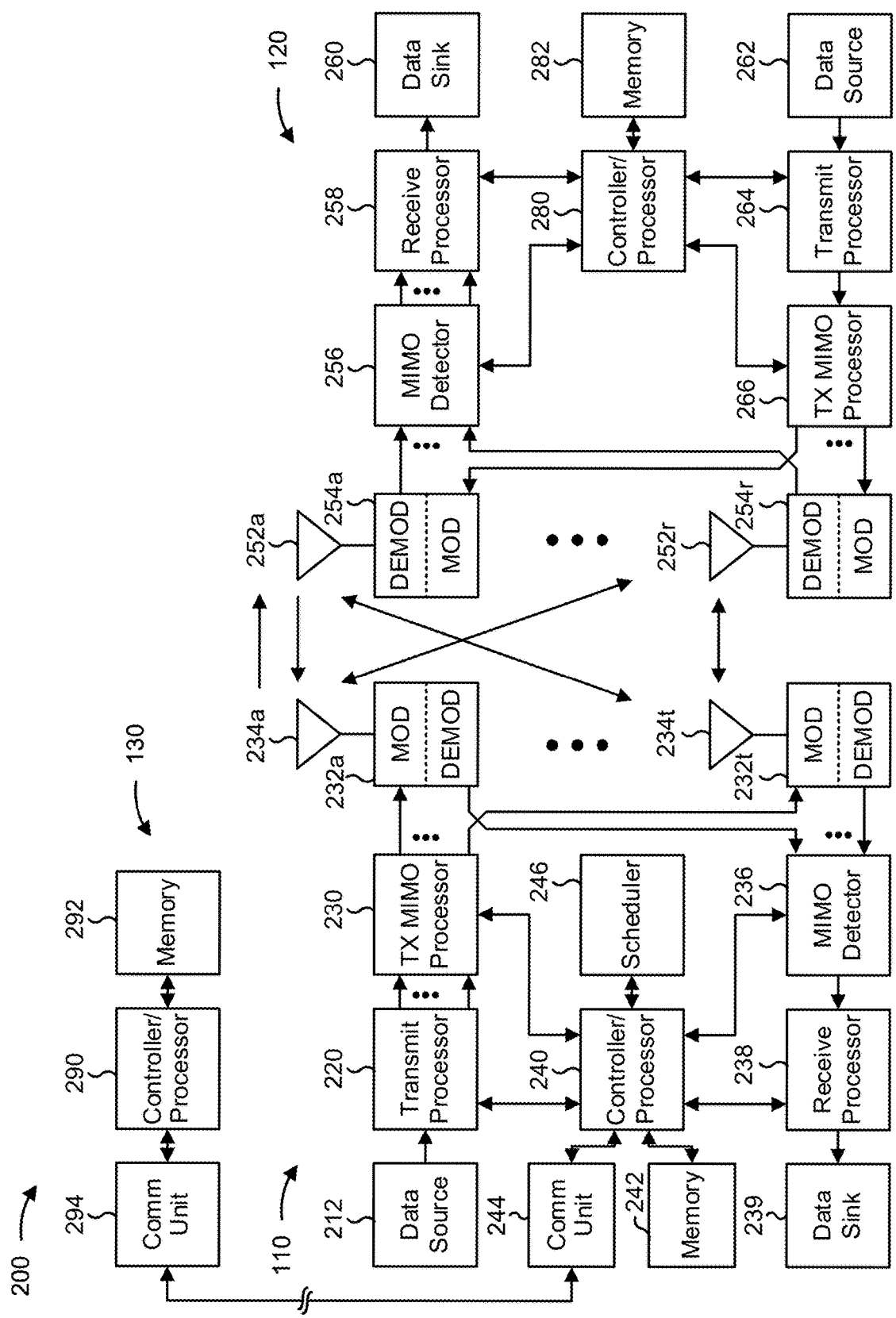
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a channel state information reference signal (CSI-RS, and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with frequency domain dimension reduction for channel state feedback, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6 and/or other processes as described herein. A scheduler 246 may schedule UEs for data transmission on the downlink and/or uplink.

In some aspects, UE 120 may include means for receiving, from a base station, a CSI-RS that includes a plurality of resource blocks, means for sub-sampling one or more portions of the plurality of resource blocks prior to performing one or more channel state feedback computations, means for performing the one or more channel state feedback computations based at least in part on the one or more sub-sampled portions of the plurality of resource blocks, means for transmitting, to the base station, a channel state feedback report based at least in part on the one or more channel state feedback computations that are performed using the one or more sub-sampled portions of the plurality of resource blocks, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
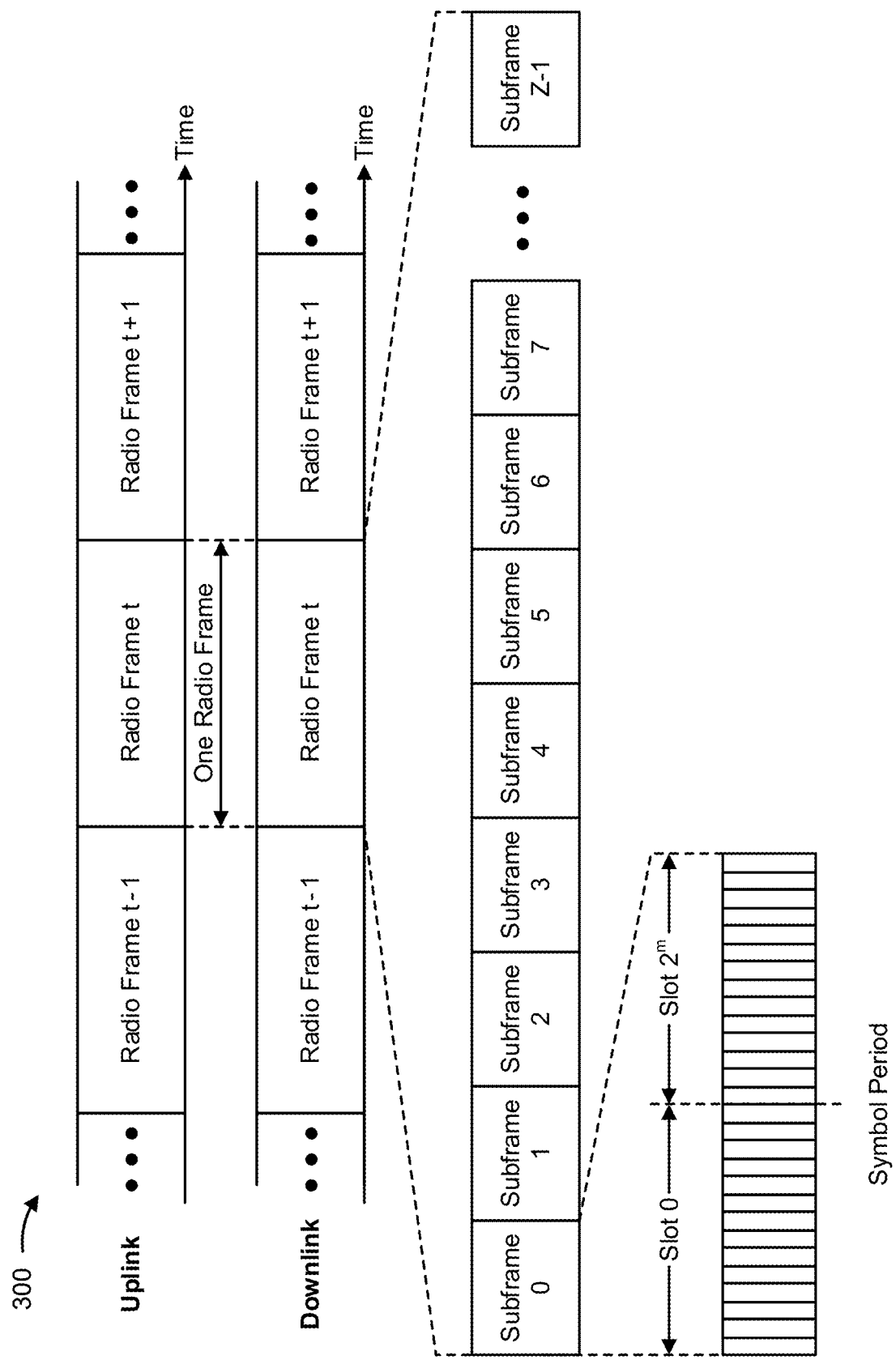
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z−1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks).

As indicated above, FIG. 3 is provided as an example. Other examples may differ from what is described with regard to FIG. 3.

Figure 4:
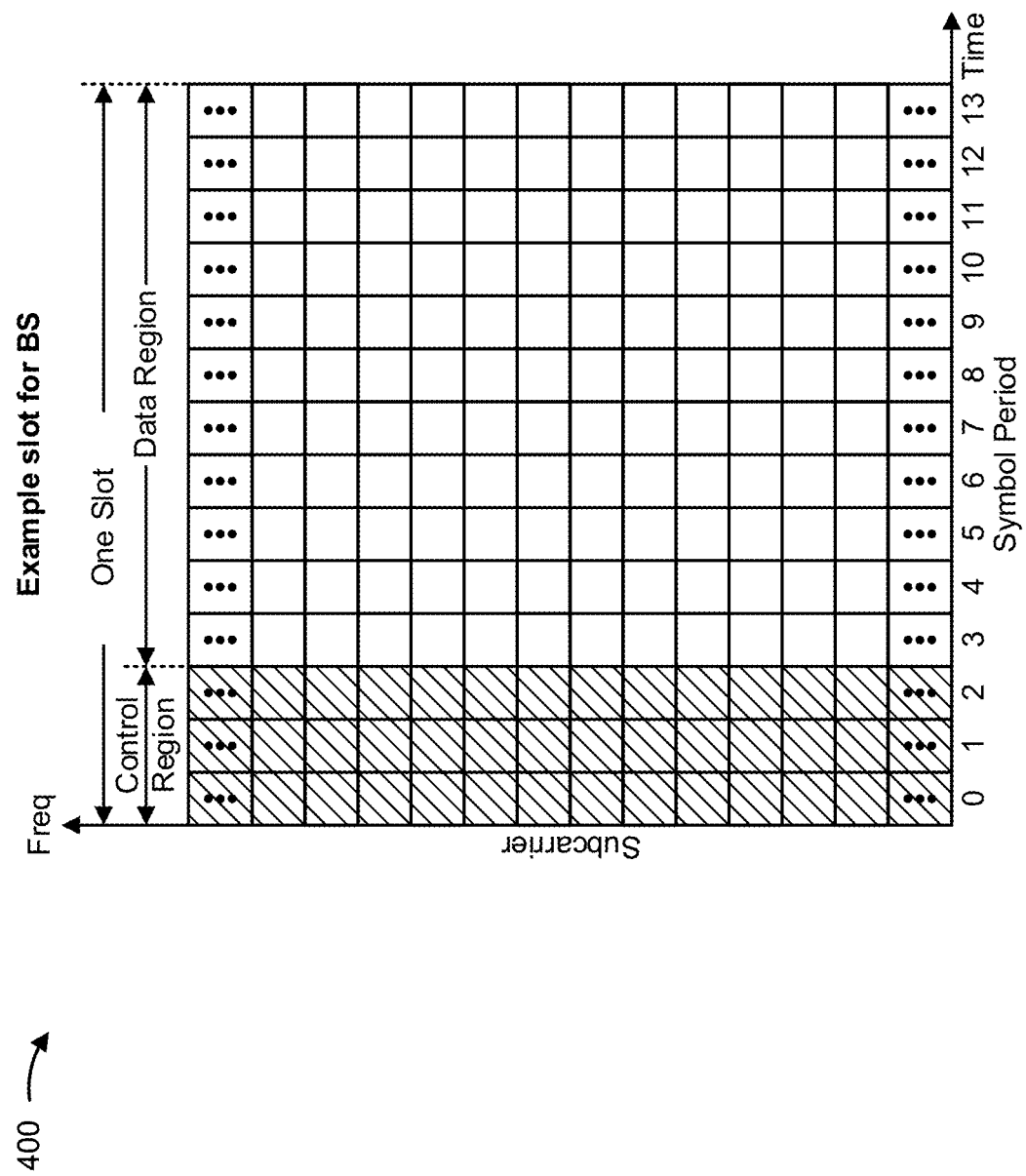
FIG. 4 is a block diagram conceptually illustrating an example slot format with a normal cyclic prefix, in accordance with various aspects of the present disclosure.

FIG. 4 shows an example slot format 400 with a normal cyclic prefix. The available time frequency resources may be partitioned into resource blocks (RBs). Each resource block may cover a set of subcarriers (e.g., 12 subcarriers) in one slot and may include a number of resource elements (REs). Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In some aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In some aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low-latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In a wireless network, such as an LTE network, an NR network, and/or the like, a transmitter (e.g., a base station) may transmit a reference signal, such as a channel state information reference signal (CSI-RS) to trigger a channel state feedback report from a receiver (e.g., a UE). For example, the receiver may obtain one or more measurements from the reference signal to determine the channel state feedback, which may include a channel quality indicator (CQI), a precoding matrix indicator (PMI), a precoding type indicator (PTI), a rank indication (RI), and/or the like. Accordingly, the channel state feedback may provide the transmitter with information related to conditions associated with a wireless channel, which the transmitter can use to select and/or adapt communication parameters (e.g., precoding, MCS selection, beam selection, and/or the like) to enhance throughput, reliability, and/or the like. For example, when channel state feedback indicates that the channel has a low quality, the transmitter may select a more conservative or robust rate to ensure that data is successfully delivered. When the channel state feedback indicates that the channel has a high quality, the transmitter may select a less conservative or robust (e.g., faster) rate to improve throughput and take advantage of the high quality channel.

Channel state feedback also serves an important function to enable high throughput and link reliability in NR networks that may use millimeter wave communication and massive MIMO antenna technology to support services that rely on high-quality channel state feedback (e.g., URLLC). For example, although millimeter waves offer very high throughput, millimeter waves have a wavelength that is significantly shorter than traditional wireless carriers and are therefore subject to reflection, scattering, blockage, and other factors that may cause channel states to change more frequently. As a result, channel state feedback may be provided to a transmitter more frequently in order to maintain reliable wireless links that have a high throughput. This can lead to significant resource consumption at the receiver, as computing channel state feedback tends to be a complex procedure that consumes substantial hardware cycles and power. Furthermore, the resource consumption that occurs at the receiver may increase as a dimension of antenna panels increases (e.g. to support larger bandwidths that may be enabled in NR or 5G wireless networks).

Some aspects described herein relate to techniques and apparatuses to reduce complexity associated with computing channel state feedback at a receiver (e.g., a UE). For example, in some aspects, a transmitter may transmit, and the receiver may receive, a CSI-RS that includes a plurality of resource blocks, and the receiver may sub-sample the plurality of resource blocks in connection with performing one or more computations to generate the channel state feedback. For example, in some aspects, the receiver may sub-sample the plurality of resource blocks according to a uniform sub-sampling factor, a non-uniform sub-sampling pattern, and/or the like, and the receiver may perform one or more channel state feedback computations based at least in part on the sub-sampled resource blocks, which generally include fewer resource blocks than are included in the CSI-RS received from the transmitter. In this way, sub-sampling the resource blocks may effectively reduce an input dimensionality associated with one or more channel state feedback computations, and therefore reduce a complexity of generating channel state feedback, with minimal changes to a CSI-RS processing flow. In this way, the resource block sub-sampling reduces hardware cycles, power, and/or other resources consumed by the receiver when the channel state feedback is computed. Furthermore, because the receiver computes the channel state feedback using fewer resource blocks, the resource block sub-sampling reduces a latency to compute and transmit the channel state feedback to the transmitter, thus improving performance.

FIGS. 5A-5D are diagrams illustrating one or more examples 500 of frequency domain dimension reduction for channel state feedback, in accordance with various aspects of the present disclosure. As shown in FIGS. 5A-5D, example(s) 500 include a base station (e.g., base station 110) and a UE (e.g., UE 120) communicating in a wireless network, such as an LTE network, an NR network, and/or the like.

Figure 5A:
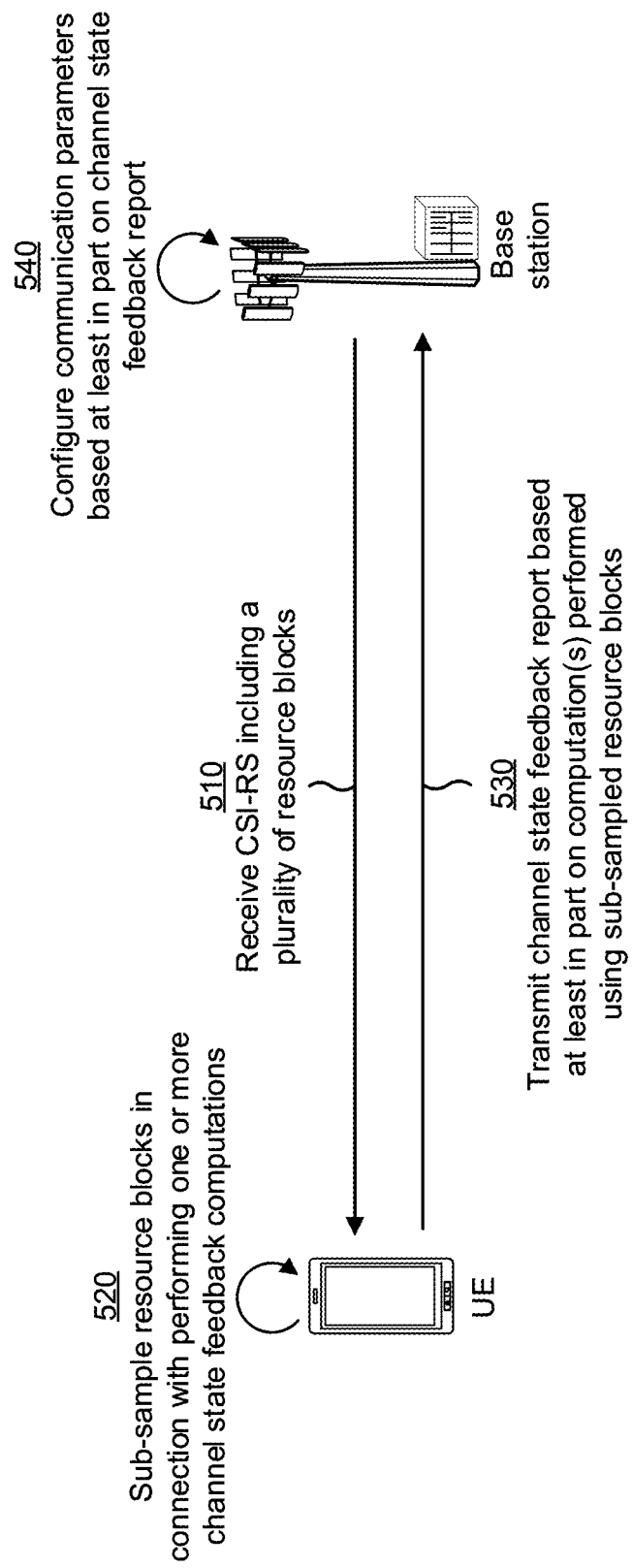
FIGS. 5A-5D are diagrams illustrating one or more examples of frequency domain dimension reduction for channel state feedback, in accordance with various aspects of the present disclosure.

As shown in FIG. 5A, and by reference number 510, the base station may transmit, and the UE may receive, a CSI-RS that includes a plurality of resource blocks. For example, in some aspects, the CSI-RS may be periodic, semi-persistent, or aperiodic (e.g., due to triggering via downlink control information (DCI)). In general, the CSI-RS is a downlink-only signal that the UE is to use to estimate a channel, obtain reference signal received power (RSRP) measurements used during mobility and beam management operations, and/or the like. Furthermore, in some aspects, a CSI-RS resource may start at any OFDM symbol in a slot and may occupy one, two, or four OFDM symbols depending on a configured number of ports (e.g., up to 32 ports). In some aspects, each resource block associated with the CSI-RS may cover a frequency resource (e.g., a set of subcarriers) in a slot. Accordingly, in some aspects, the plurality of resource blocks included in the CSI-RS may generally cover a set of frequency resources across one or more slots.

As further shown in FIG. 5A, and by reference number 520, the UE may sub-sample the resource blocks associated with the CSI-RS in connection with performing one or more channel state feedback computations. For example, as described herein, the UE may perform one or more channel state feedback computations based at least in part on one or more sub-sampled portions of the resource blocks included in the CSI-RS received from the base station, where the sub-sampled portion(s) of the resource blocks generally include fewer than all of the resource blocks included in the CSI-RS received from the base station. For example, in some aspects, the UE may sub-sample the resource blocks included in the CSI-RS received from the base station according to a uniform sub-sampling factor, which may include selecting every $N^{th}$ resource block among the resource blocks included in the received CSI-RS, where N is an integer having a value greater than one. For example, the UE may perform one or more channel state feedback computations using every other resource block when N has a value of two, using every fourth resource block when N has a value of four, and/or the like. In this way, performing the one or more channel state feedback computations using a sub-sampled portion of the resource blocks included in the CSI-RS may reduce an input dimensionality and reduce a complexity for the one or more channel state feedback computations with minimal change to an overall CSI-RS processing flow.

Additionally, or alternatively, the UE may sub-sample the resource blocks included in the CSI-RS received from the base station according to a non-uniform sub-sampling pattern. For example, in some aspects, the non-uniform sub-sampling pattern may be based at least in part on a particular spectral region or target frequency region, where the UE may perform one or more channel state feedback computations using all of the resource blocks that are within the particular spectral region or target frequency region (e.g., by applying a full sampling rate, or a sub-sampling factor of one) and sub-sample only resource blocks that are outside the particular spectral region or target frequency region. In this way, the non-uniform sub-sampling pattern can be applied to provide a higher input resolution, and thus greater accuracy, for resource blocks that are within the particular spectral region or target frequency region, while sub-sampling the resource blocks that are outside the particular spectral region or target frequency region may result in reduced input dimensionality and/or complexity to conserve computing resources, reduce latency, and/or the like. Additionally, or alternatively, a relatively higher sub-subsampling factor may be applied for the resource blocks that are outside the particular spectral region or target frequency region to compensate for the greater input dimensionality and/or complexity associated with processing a larger quantity of the resource blocks within the particular spectral region or target frequency region. For example, in some aspects, resource blocks within the spectral region or target frequency region of interest may be sub-sampled according to a sub-sampling factor of 2 (sampling every other resource block), and resource blocks outside the spectral region or target frequency region of interest may be sub-sampled according to a sub-sampling factor of 4 (sampling every fourth resource block).

In some aspects, as described above, the resource block sub-sampling may be performed in connection with (e.g., prior to) one or more channel state feedback computations. In general, as described herein, input dimensionality and/or complexity reduction may vary depending on the channel state feedback computation(s) performed using a sub-sampled portion of the resource blocks associated with the CSI-RS.

Figure 5B:
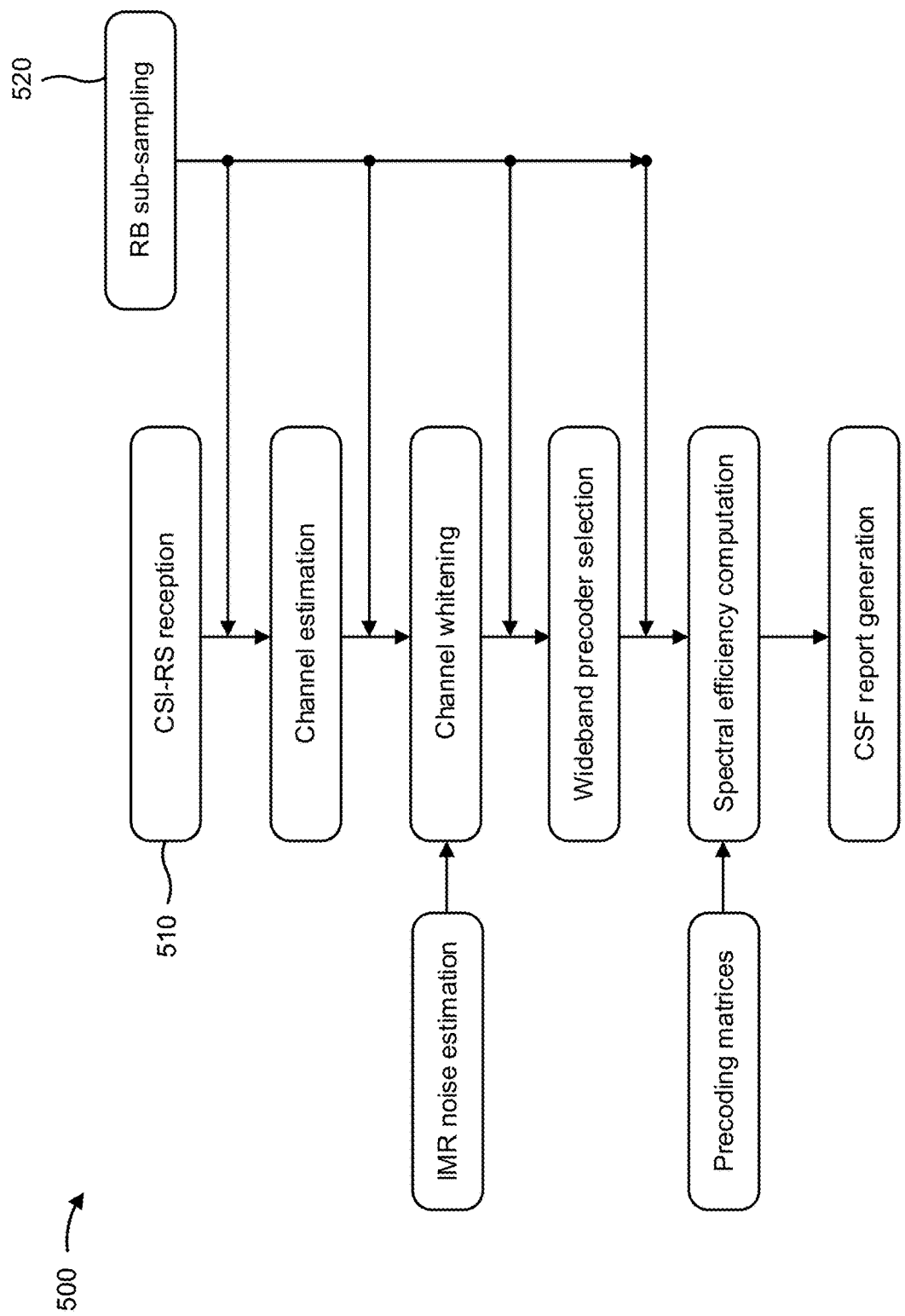

For example, as shown in FIG. 5B, a CSI-RS processing flow may generally begin with the UE receiving the CSI-RS from the base station, and the UE may then perform channel estimation based at least in part on the CSI-RS. In some aspects, as further shown in FIG. 5B, the UE may then perform a channel whitening based at least in part on an output from the channel estimation and an interference measurement resource (IMR) noise estimation. For example, the channel whitening may generally include a decorrelation process to reduce autocorrelation within a signal or cross-correlation within a set of signals while preserving other aspects of the signal (e.g., by equalizing a power spectrum of the signal to be similar to a white noise signal). For example, in some aspects, the output from the channel estimation may include an input vector with a known covariance matrix, which may be subject to a linear transformation into a white noise vector having a substantially equal power density at different frequencies. In some aspects, in cases where the UE has a quantity of transmit antennas that satisfies a threshold (e.g., four or more transmit antennas), the CSI-RS processing flow may further include a wideband precoder selection, sometimes referred to as W1 selection and/or the like. Furthermore, the CSI-RS processing flow may include a spectral efficiency (SPEF) computation, which may operate on one or more precoding matrices and an output from the wideband precoder selection in cases where the quantity of transmit antennas that satisfies the threshold, or on an output from the channel whitening in cases where the quantity of transmit antennas fails to satisfy the threshold. In some aspects, the SPEF computation may include several sub-computations, which may include an effective channel computation, a linear minimum mean square error (LMMSE) signal-to-noise ratio (SNR) estimation, a SNR-to-SPEF transformation, an aggregate SPEF computation, and/or the like. Accordingly, after the UE has performed the channel estimation, channel whitening, wideband precoder selection, and/or SPEF computations, the UE may generate a channel state feedback report based at least in part on the various computations.

As further shown in FIG. 5B, the resource block sub-sampling may be performed at one or more points within the CSI-RS processing flow, and the resource block sub-sampling may reduce complexity associated with one or more channel state feedback computations depending on where the sub-sampling is performed within the CSI-RS processing flow. For example, in some aspects, the resource block sub-sampling may be performed prior to the channel estimation, which may result in a maximum complexity reduction because all computations within the CSI-RS processing flow are performed using a portion of the total resource blocks included in the CSI-RS. However, in some cases, sub-sampling the resource blocks prior to the channel estimation may result in a reduced input resolution for all of the channel state feedback computations within the CSI-RS processing flow. Accordingly, another option may be to perform the resource block sub-sampling on an output from the channel estimation and prior to performing the channel whitening, in which case the channel whitening, wideband precoder selection, and SPEF computation may each be performed using a set of resource blocks with a reduced input dimensionality. For example, sub-sampling the resource blocks at the output from the channel estimation computation using a sub-sampling factor of 2 may result in a 40% cycle reduction for the channel whitening computation, a 25% cycle reduction for the wideband precoder selection computation, and a 50% cycle reduction for the SPEF computation. Furthermore, increasing the sub-sampling factor may increase these cycle reductions, although accuracy of the channel state feedback computations may decrease as the sub-sampling factor increases. In still other examples, the resource blocks associated with the CSI-RS may be sub-sampled at an output from the channel whitening computation and prior to performing the wideband precoder selection (e.g., to reduce precoder selection complexity), or the resource blocks associated with the CSI-RS may be sub-sampled at an output from the wideband precoder selection and prior to performing the SPEF computation (e.g., to enable a higher resolution for the wideband precoder selection and/or a lower input resolution for the SPEF computation that tends to be computationally expensive).

Additionally, or alternatively, in some aspects, the resource block sub-sampling may be performed to reduce the input dimensionality for certain channel state feedback computations, while others are performed using all of the resource blocks included in the CSI-RS. For example, the resource block sub-sampling may be performed for the wideband precoder selection only to reduce complexity of the wideband precoder selection, and the channel estimation, channel whitening, and SPEF computations may be performed using all of the resource blocks included in the CSI-RS. Additionally, or alternatively, different sub-sampling factors and/or sub-sampling patterns can be applied for different channel state feedback computations. In this case, a first set of one or more channel state feedback computations may be performed using a sub-sampling factor of M and a second set of one or more channel state feedback computations may be performed using a sub-sampling factor of N, where M and N are integers that have different values greater than one. For example, in some aspects, the channel whitening and SPEF computations may be performed using a sub-sampling factor of 2, and the wideband precoder selection may be performed using a sub-sampling factor of 4. Furthermore, in general, performing one or more channel state feedback computations using a sub-sampled portion of the resource blocks included in the CSI-RS as described herein may result in negligible performance loss.

Figure 5C:
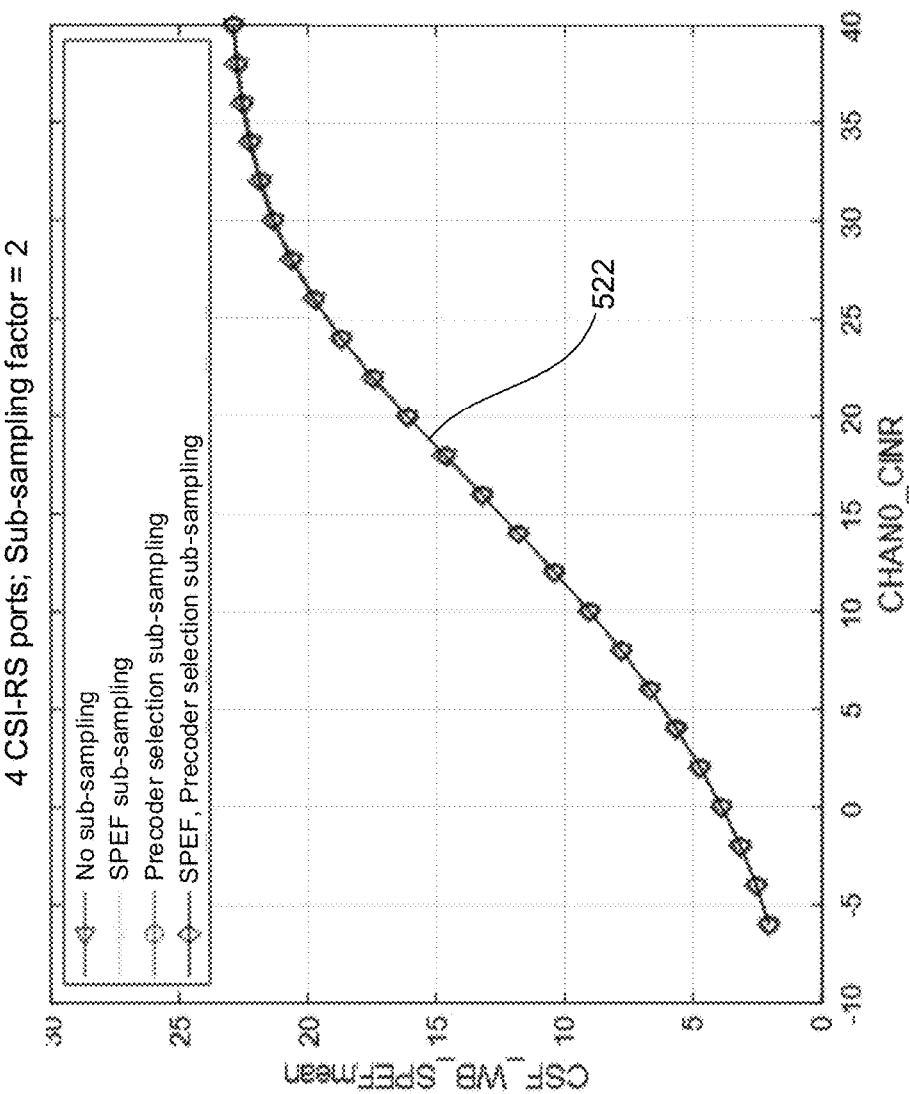

For example, as shown in FIG. 5C, curve 522 illustrates simulation results obtained when applying different combinations of resource block sub-sampling in connection with wideband precoder selection and spectral efficiency computations. In particular, the example simulation results depicted in FIG. 5C represent mean CQI values obtained for a CSI-RS that includes 108 resource blocks transmitted using four ports over a 40 MHz bandwidth with a subcarrier spacing of 30 kHz, which is received at a UE with four receive antennas. Furthermore, as shown, curve 522 represents simulation results obtained when no resource block sub-sampling is performed (e.g., the wideband precoder selection and SPEF computations are performed using all 108 resource blocks included in the CSI-RS), and simulation results obtained when a sub-sampling factor of 2 is applied for the SPEF computation only, the wideband precoder selection only, and for both the SPEF computation and the wideband precoder selection only. As shown by curve 522, applying the sub-sampling factor results in negligible performance loss, as CQI values obtained under conditions when no sub-sampling is applied closely track CQI values that are obtained when the sub-sampling factor of 2 is applied for the SPEF computation and/or the wideband precoder selection.

Figure 5D:
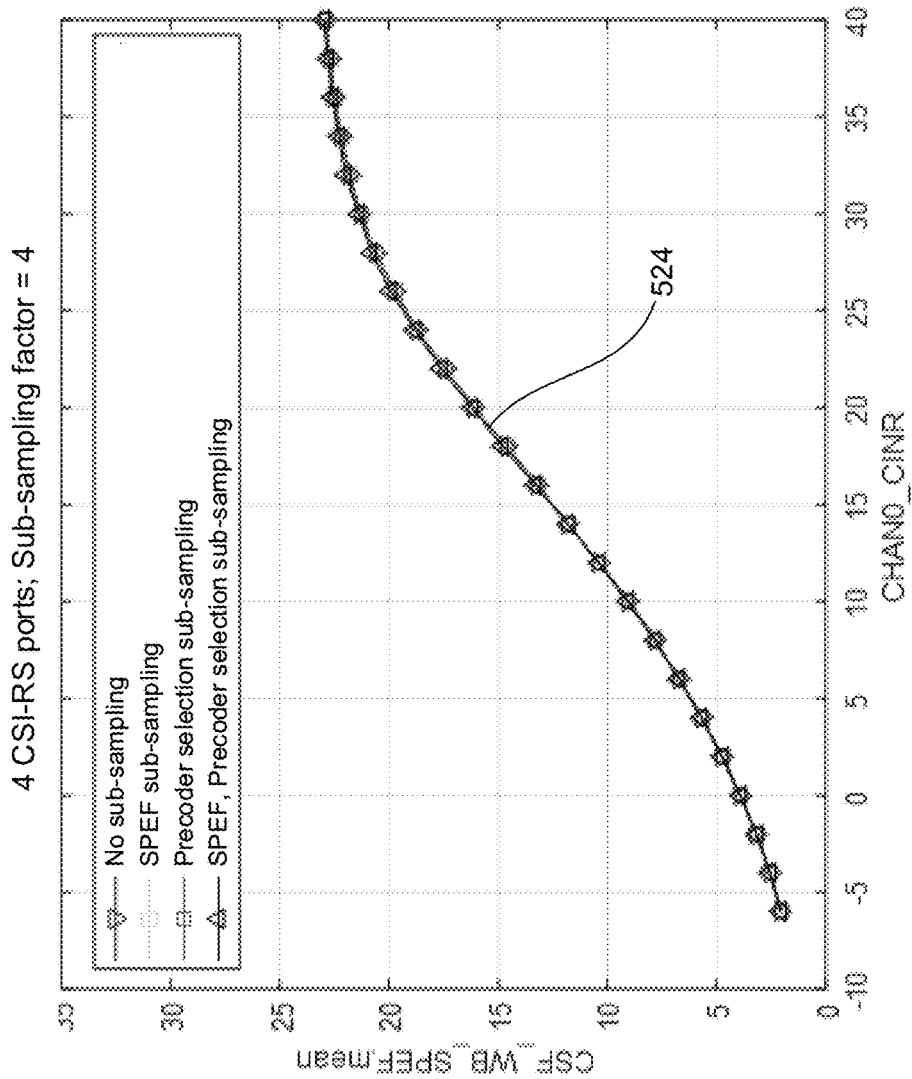

In another example, as shown in FIG. 5D, curve 524 illustrates simulation results obtained when applying different combinations of resource block sub-sampling in connection with wideband precoder selection and spectral efficiency computations, except in this case a sub-sampling factor of 4 is applied. As shown by curve 524, applying the sub-sampling factor results in negligible performance loss, as CQI values obtained under conditions when no sub-sampling is applied closely track CQI values that are obtained when the sub-sampling factor of 4 is applied for the SPEF computation and/or the wideband precoder selection.

Accordingly, as described herein, the UE may sub-sample the resource blocks included in the CSI-RS received from the base station according to a uniform sub-sampling factor, a non-uniform sub-sampling pattern, and/or the like, and one or more channel state feedback computations may be performed using a sub-sampled portion of the resource blocks included in the CSI-RS received from the base station. As further shown in FIG. 5A, and by reference number 530, the UE may transmit, and the base station may receive, a channel state feedback report based at least in part on the channel state feedback computation(s) performed using the sub-sampled resource blocks. In this way, the UE may significantly reduce the complexity of the channel state feedback computations that are performed to generate the channel state feedback report, which reduces hardware cycles, power consumption, and/or other resource consumption at the UE without causing any noticeable performance loss. Furthermore, because the UE can generate the channel state feedback from a set of input resource blocks with a reduced dimensionality, a latency associated with generating and transmitting the channel state feedback report to the base station may be reduced. Furthermore, the sub-sampling applied at the UE may be substantially transparent from the perspective of the base station (e.g., there may be no change to the process of transmitting the CSI-RS to the UE and receiving and processing the channel state feedback report from the UE from the perspective of the base station).

As further shown in FIG. 5A, and by reference number 540, the base station may then configure one or more communication parameters (e.g., to increase throughput, increase reliability, and/or the like) based at least in part on the channel state feedback report provided by the UE. For example, in some aspects, the channel state feedback report may include information related to conditions of a wireless channel between the base station and the UE, such as a channel quality indicator (CQI), a precoding matrix indicator (PMI), a precoding type indicator (PTI), a rank indication (RI), and/or the like. Accordingly, the base station may select and/or adapt communication parameters (e.g., precoding, MCS selection, beam selection, and/or the like) to enhance throughput, reliability, and/or the like according to the wireless channel conditions indicated in the channel state feedback report that is generated by the UE based at least in part on one or more sub-sampled portions of the CSI-RS transmitted by the base station.

As indicated above, FIGS. 5A-5D are provided as one or more examples. Other examples may differ from what is described with respect to FIGS. 5A-5D.

Figure 6:
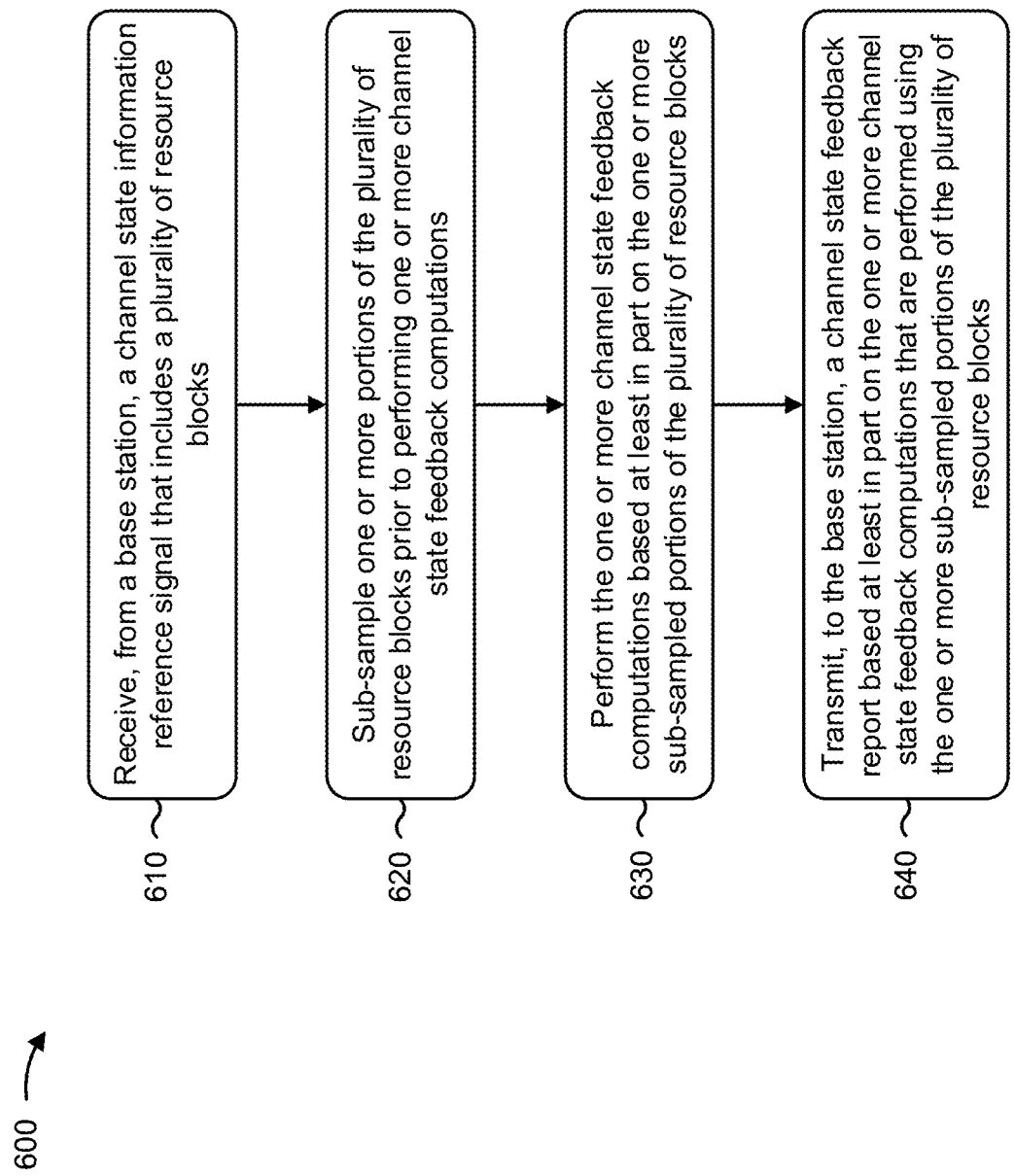
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with frequency domain dimension reduction for channel state feedback.

As shown in FIG. 6, in some aspects, process 600 may include receiving, from a base station, a CSI-RS that includes a plurality of resource blocks (block 610). For example, the UE may receive (e.g., using antenna 252, DEMOD 254, MIMO detector 256, receive processor 258, controller/processor 280, and/or the like), from a base station, a CSI-RS that includes a plurality of resource blocks, as described above.

As further shown in FIG. 6, in some aspects, process 600 may include sub-sampling one or more portions of the plurality of resource blocks prior to performing one or more channel state feedback computations (block 620). For example, the UE may sub-sample (e.g., using controller/processor 280 and/or the like) one or more portions of the plurality of resource blocks prior to performing one or more channel state feedback computations, as described above.

As further shown in FIG. 6, in some aspects, process 600 may include performing the one or more channel state feedback computations based at least in part on the one or more sub-sampled portions of the plurality of resource blocks (block 630). For example, the UE may perform (e.g., using controller/processor 280 and/or the like) the one or more channel state feedback computations based at least in part on the one or more sub-sampled portions of the plurality of resource blocks, as described above.

As further shown in FIG. 6, in some aspects, process 600 may include transmitting, to the base station, a channel state feedback report based at least in part on the one or more channel state feedback computations that are performed using the one or more sub-sampled portions of the plurality of resource blocks (block 640). For example, the UE may transmit (e.g., using controller/processor 280, transmit processor 264, TX MIMO processor 266, MOD 254, antenna 252, and/or the like), to the base station, a channel state feedback report based at least in part on the one or more channel state feedback computations that are performed using the one or more sub-sampled portions of the plurality of resource blocks, as described above.

Process 600 may include additional aspects, such as any single aspect or any combination of aspects described below and/or in connection with one or more other processes described elsewhere herein.

In a first aspect, the one or more portions of the plurality of resource blocks are sub-sampled according to a uniform sub-sampling factor.

In a second aspect, alone or in combination with the first aspect, the one or more sub-sampled portions of the plurality of resource blocks include every $N^{th}$ resource block among the plurality of resource blocks, where N is an integer having a value greater than one.

In a third aspect, alone or in combination with one or more of the first and second aspects, the one or more channel state feedback computations include a first channel state feedback computation performed on a first set of resource blocks that includes every $M^{th}$ resource block among the plurality of resource blocks and a second channel state feedback computation performed on a second set of resource blocks that includes every $N^{th}$ resource block among the plurality of resource blocks, where M and N are integers with different values greater than one.

In a fourth aspect, alone or in combination with one or more of the first through third aspects, the one or more portions of the plurality of resource blocks are sub-sampled according to a non-uniform sub-sampling pattern.

In a fifth aspect, alone or in combination with one or more of the first through fourth aspects, the one or more sub-sampled portions of the plurality of resource blocks include a first subset of the plurality of resource blocks that are outside a target frequency region, and the one or more channel state feedback computations are further performed using a second subset of the plurality of resource blocks that includes all resource blocks within the target frequency region.

In a sixth aspect, alone or in combination with one or more of the first through fifth aspects, the one or more channel state feedback computations performed using the one or more sub-sampled portions of the plurality of resource blocks include one or more of a channel estimation, a channel whitening, a wideband precoder selection, or a spectral efficiency computation.

In a seventh aspect, alone or in combination with one or more of the first through sixth aspects, the one or more portions of the plurality of resource blocks are sub-sampled prior to performing a channel estimation.

In an eighth aspect, alone or in combination with one or more of the first through seventh aspects, the one or more portions of the plurality of resource blocks are sub-sampled based at least in part on a channel estimation output and prior to performing a channel whitening.

In a ninth aspect, alone or in combination with one or more of the first through eighth aspects, the one or more portions of the plurality of resource blocks are sub-sampled based at least in part on a channel whitening output and prior to performing a wideband precoder selection.

In a tenth aspect, alone or in combination with one or more of the first through ninth aspects, the one or more portions of the plurality of resource blocks are sub-sampled based at least in part on a wideband precoder selection output and prior to performing a spectral efficiency computation.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a base station, a channel state information reference signal that includes a plurality of resource blocks;
   sub-sampling one or more portions of the plurality of resource blocks, prior to performing one or more channel state feedback computations, to identify one or more sub-sampled portions of the plurality of resource blocks, wherein the one or more sub-sampled portions comprises fewer resource blocks than the plurality of resource blocks received from the base station;
   performing the one or more channel state feedback computations based at least in part on the one or more sub-sampled portions of the plurality of resource blocks; and
   transmitting, to the base station, a channel state feedback report based at least in part on the one or more channel state feedback computations that are performed based at least in part on the one or more sub-sampled portions of the plurality of resource blocks.

2. The method of claim 1, wherein the one or more portions of the plurality of resource blocks are sub-sampled according to a uniform sub-sampling factor.

3. The method of claim 1, wherein the one or more sub-sampled portions of the plurality of resource blocks include every $N^{th}$ resource block among the plurality of resource blocks, where N is an integer having a value greater than one.

4. The method of claim 1, wherein the one or more channel state feedback computations include a first channel state feedback computation performed on a first set of resource blocks that includes every $M^{th}$ resource block among the plurality of resource blocks and a second channel state feedback computation performed on a second set of resource blocks that includes every $N^{th}$ resource block among the plurality of resource blocks, where M and N are integers with different values greater than one.

5. The method of claim 1, wherein the one or more portions of the plurality of resource blocks are sub-sampled according to a non-uniform sub-sampling pattern.

6. The method of claim 1, wherein the one or more sub-sampled portions of the plurality of resource blocks include a first subset of the plurality of resource blocks that are outside a target frequency region, and wherein the one or more channel state feedback computations are further performed using a second subset of the plurality of resource blocks that includes all resource blocks within the target frequency region.

7. The method of claim 1, wherein the one or more channel state feedback computations performed using the one or more sub-sampled portions of the plurality of resource blocks include one or more of a channel estimation, a channel whitening, a wideband precoder selection, or a spectral efficiency computation.

8. The method of claim 1, wherein the one or more portions of the plurality of resource blocks are sub-sampled prior to performing a channel estimation.

9. The method of claim 1, wherein the one or more portions of the plurality of resource blocks are sub-sampled based at least in part on a channel estimation output and prior to performing a channel whitening.

10. The method of claim 1, wherein the one or more portions of the plurality of resource blocks are sub-sampled based at least in part on a channel whitening output and prior to performing a wideband precoder selection.

11. The method of claim 1, wherein the one or more portions of the plurality of resource blocks are sub-sampled based at least in part on a wideband precoder selection output and prior to performing a spectral efficiency computation.

12. A user equipment (UE) for wireless communication, comprising:
a memory; and
one or more processors coupled to the memory, the one or more processors configured to:
receive, from a base station, a channel state information reference signal that includes a plurality of resource blocks;
sub-sample one or more portions of the plurality of resource blocks, prior to performing one or more channel state feedback computations, to identify one or more sub-sampled portions of the plurality of resource blocks, wherein the one or more sub-sampled portions comprises fewer resource blocks than the plurality of resource blocks received from the base station;
perform the one or more channel state feedback computations based at least in part on the one or more sub-sampled portions of the plurality of resource blocks; and
transmit, to the base station, a channel state feedback report based at least in part on the one or more channel state feedback computations that are performed based at least in part on the one or more sub-sampled portions of the plurality of resource blocks.

13. The UE of claim 12, wherein the one or more portions of the plurality of resource blocks are sub-sampled according to a uniform sub-sampling factor.

14. The UE of claim 12, wherein the one or more sub-sampled portions of the plurality of resource blocks include every Nth resource block among the plurality of resource blocks, where N is an integer having a value greater than one.

15. The UE of claim 12, wherein the one or more channel state feedback computations include a first channel state feedback computation performed on a first set of resource blocks that includes every Mth resource block among the plurality of resource blocks and a second channel state feedback computation performed on a second set of resource blocks that includes every Nth resource block among the plurality of resource blocks, where M and N are integers with different values greater than one.

16. The UE of claim 12, wherein the one or more portions of the plurality of resource blocks are sub-sampled according to a non-uniform sub-sampling pattern.

17. The UE of claim 12, wherein the one or more sub-sampled portions of the plurality of resource blocks include a first subset of the plurality of resource blocks that are outside a target frequency region, and wherein the one or more channel state feedback computations are further performed using a second subset of the plurality of resource blocks that includes all resource blocks within the target frequency region.

18. The UE of claim 12, wherein the one or more channel state feedback computations performed using the one or more sub-sampled portions of the plurality of resource blocks include one or more of a channel estimation, a channel whitening, a wideband precoder selection, or a spectral efficiency computation.

19. The UE of claim 12, wherein the one or more portions of the plurality of resource blocks are sub-sampled prior to performing a channel estimation.

20. The UE of claim 12, wherein the one or more portions of the plurality of resource blocks are sub-sampled based at least in part on a channel estimation output and prior to performing a channel whitening.

21. The UE of claim 12, wherein the one or more portions of the plurality of resource blocks are sub-sampled based at least in part on a channel whitening output and prior to performing a wideband precoder selection.

22. The UE of claim 12, wherein the one or more portions of the plurality of resource blocks are sub-sampled based at least in part on a wideband precoder selection output and prior to performing a spectral efficiency computation.

23. A non-transitory computer-readable medium storing one or more instructions for wireless communication, the one or more instructions comprising:
one or more instructions that, when executed by one or more processors of a user equipment, cause the one or more processors to:
receive, from a base station, a channel state information reference signal that includes a plurality of resource blocks;
sub-sample one or more portions of the plurality of resource blocks, prior to performing one or more channel state feedback computations, to identify one or more sub-sampled portions of the plurality of resource blocks, wherein the one or more sub-sampled portions comprises fewer resource blocks than the plurality of resource blocks received from the base station;
perform the one or more channel state feedback computations based at least in part on the one or more sub-sampled portions of the plurality of resource blocks; and
transmit, to the base station, a channel state feedback report based at least in part on the one or more channel state feedback computations that are performed using based at least in part on the one or more sub-sampled portions of the plurality of resource blocks.

24. The non-transitory computer-readable medium of claim 23, wherein the one or more portions of the plurality of resource blocks are sub-sampled according to a uniform sub-sampling factor.

25. The non-transitory computer-readable medium of claim 23, wherein the one or more portions of the plurality of resource blocks are sub-sampled according to a non-uniform sub-sampling pattern.

26. The non-transitory computer-readable medium of claim 23, wherein the one or more channel state feedback computations performed using the one or more sub-sampled portions of the plurality of resource blocks include one or more of a channel estimation, a channel whitening, a wideband precoder selection, or a spectral efficiency computation.

27. An apparatus for wireless communication, comprising:
means for receiving, from a base station, a channel state information reference signal that includes a plurality of resource blocks;
means for sub-sampling one or more portions of the plurality of resource blocks, prior to performing one or more channel state feedback computations, to identify one or more sub-sampled portions of the plurality of resource blocks, wherein the one or more sub-sampled portions comprises fewer resource blocks than the plurality of resource blocks received from the base station;

means for performing the one or more channel state feedback computations based at least in part on the one or more sub-sampled portions of the plurality of resource blocks; and means for transmitting, to the base station, a channel state feedback report based at least in part on the one or more channel state feedback computations that are performed based at least in part on the one or more sub-sampled portions of the plurality of resource blocks.

28. The apparatus of claim 27, wherein the one or more portions of the plurality of resource blocks are sub-sampled according to a uniform sub-sampling factor.

29. The apparatus of claim 27, wherein the one or more portions of the plurality of resource blocks are sub-sampled according to a non-uniform sub-sampling pattern.

30. The apparatus of claim 27, wherein the one or more channel state feedback computations performed using the one or more sub-sampled portions of the plurality of resource blocks include one or more of a channel estimation, a channel whitening, a wideband precoder selection, or a spectral efficiency computation.

\* \* \* \* \*